April 11, 1967    D. W. STATTER    3,313,210
PORTABLE KEY WAY CUTTING FIXTURE
Filed March 4, 1965    2 Sheets-Sheet 1
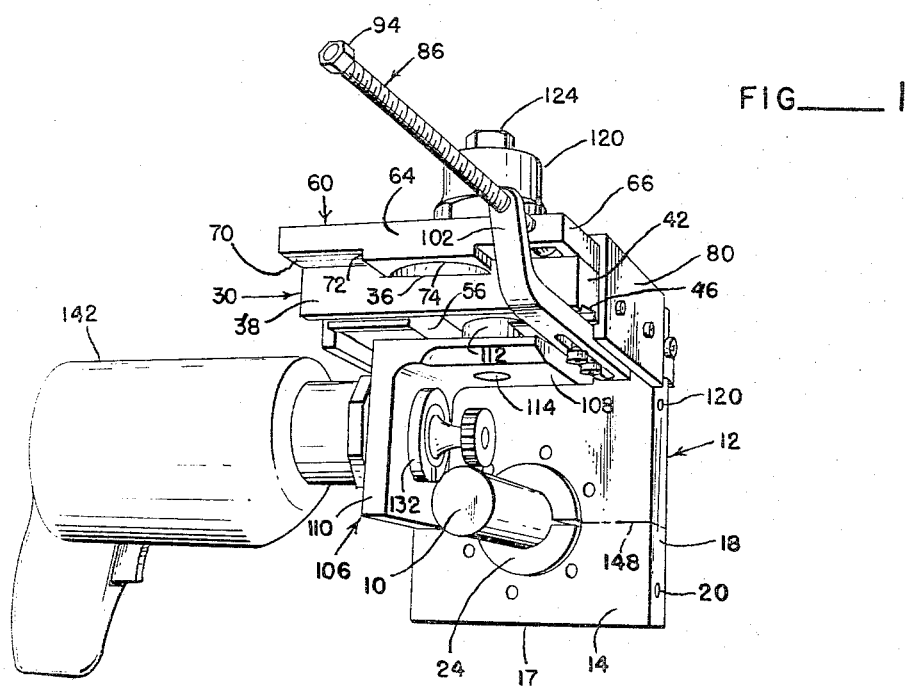
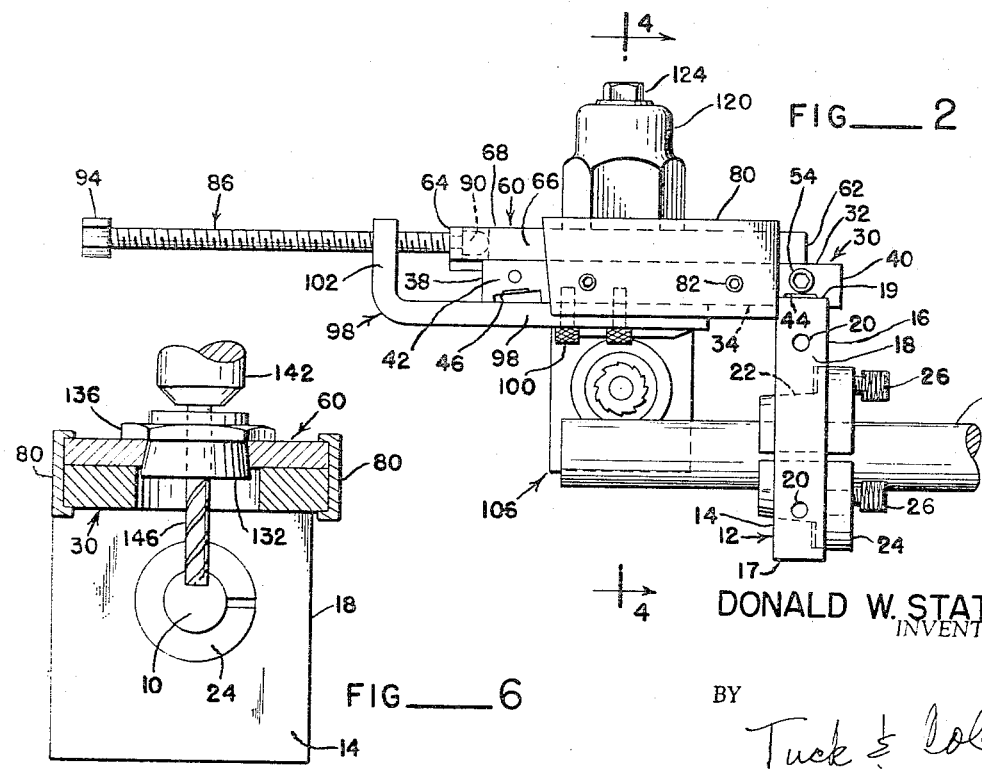
DONALD W. STATTER
INVENTOR.
BY Tuck & Cole

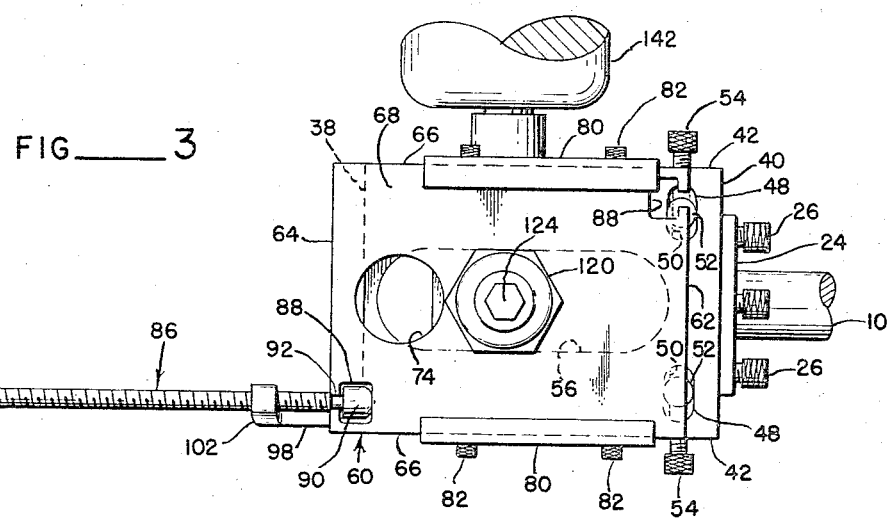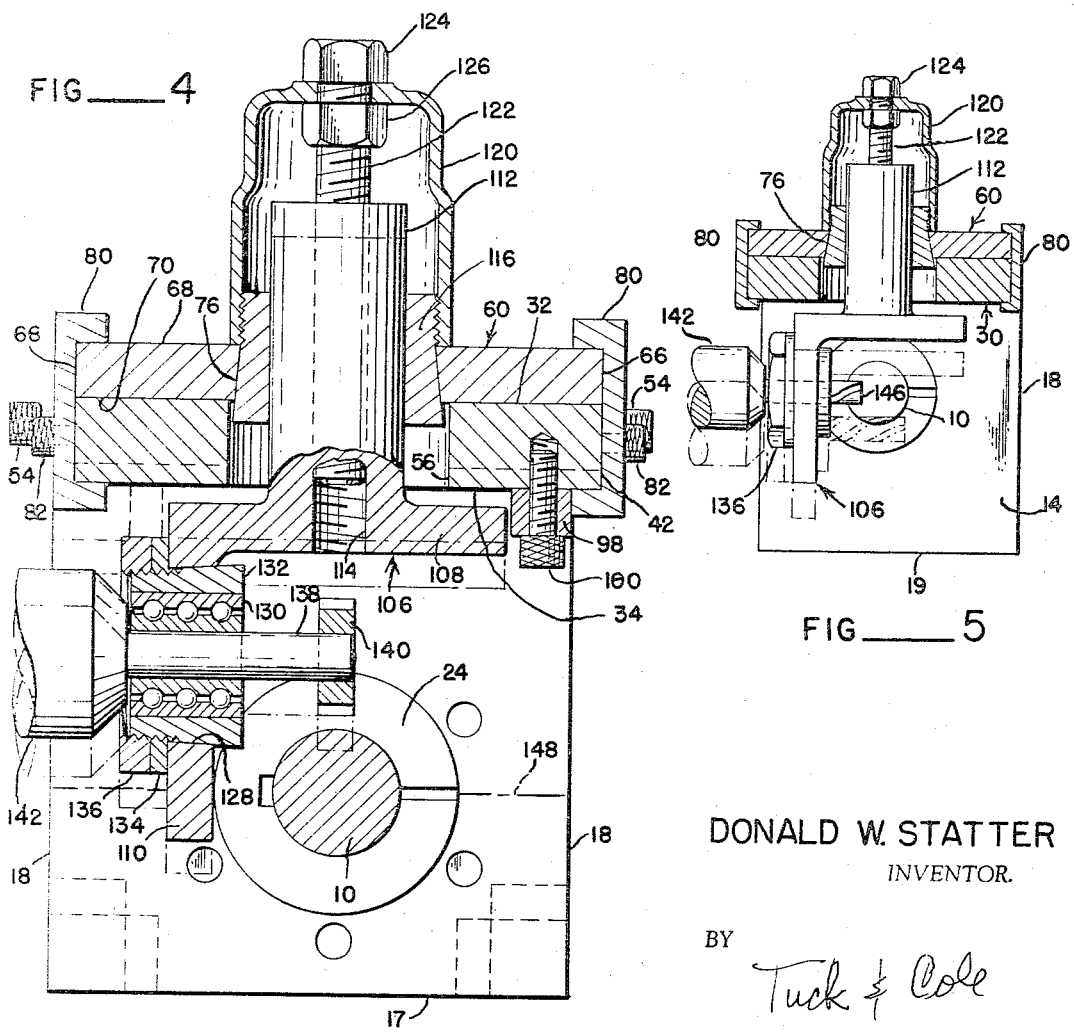

United States Patent Office 3,313,210
Patented Apr. 11, 1967

3,313,210
PORTABLE KEY WAY CUTTING FIXTURE
Donald W. Statter, 9858 Thermal St.,
Oakland, Calif. 94605
Filed Mar. 4, 1965, Ser. No. 437,168
7 Claims. (Cl. 90—12)

This invention relates to a new and novel concept in portable key way cutting fixtures, and more particularly to a portable key way cutting fixture which is designed to hold a cutting tool in proper position with respect to the work piece and which allows the cutting tool to be driven by common workshop-type hand drills.

There has been considerable effort in the past towards the development of a portable-type key way cutting fixture. Such efforts have, for the most part, been unsuccessful because unwieldy, complicated, and/or costly. Also, some heretofore known portable devices attempted to carry their own power means, making them bulky and impractical. If the heretofore known portable fixtures were either permanently or semi-permanently constructed, is was found that the devices had no flexibility by which to be mounted or received from various angles, as from the top, bottom, side, or front of the shaft. Other disadvantages of prior devices include lack of accuracy and questionable reliability.

The present invention overcomes the deficiencies of prior art devices in uniquely conceived and simplified principle and design. A main supporting plate having shaft gripping means mounted therein, is designed to be received on the shaft or to be held securely, as for instance in a vise. The supporting plate is substantially square. Detachably secured by one edge at substantially right angles thereto is a guide plate. A slide plate is mounted on the guide plate and a screw-feed device interconnected between the slide plate and guide plate to move the slide plate along a longitudinal track. The guideplate is slotted from one end to the other along its center portion, while the slide plate has either a cutter holding means or a cutter adapter bracket. The adapter, which is gripped firmly by means attached to the slide plate, extends through the slot in the guide plate to allow a cutter tool to be brought into contact with the work piece. A conventional power drill is connected to the shank of the cutting tool and turned on, while at the same time the operator applies torque to the screw feed by means of a wrench and thus moves the cutting tool into the work piece.

Accordingly, it is a feature of this invention to provide portable key way cutting fixture which is simple in design, rugged, dependable, and accurate.

Another feature of this invention is to provide a portable key way cutting fixture which allows either Woodruff cutters or end mills to be used therewith for cutting key ways in shafts and for application to other work pieces.

Still another feature of this invention is to provide a portable key way cutting fixture in which the parts are detachably secured one to the other, and in which various-sized shafts can be accommodated and various-sized key ways shaped in said shafts.

Yet another feature of this invention is to provide a portable key way cutting fixture which, because of its detachable assembly and compactness, permits the operator to install the fixture on a shaft without removing said shaft from the environment or equipment in which it is located.

A further feature of this invention is to provide a portable key way cutting fixture which, because of its compactness and flexibility, allows the fixture itself to be mounted securely as in a vise and the work piece to be brought to and held in said fixture free of its environment.

Yet another feature of this invention is to provide a portable key way cutting fixture which permits the use of both Woodruff and end mill type cutting bits.

An even further feature of this invention is to provide a portable key way cutting fixture which allows the cutter bit to be brought to the work piece from any angle.

These, and other features and advantages reside in the details of the construction and operation, as more fully hereinafter described and claimed. Reference will be had to the accompanying drawings, wherein like numerals refer to like parts throughout, and in which:

FIGURE 1 is a view in perspective showing how a hand drill is attached to the shank of a cutting tool, and also showing how the work piece is supported with respect to the parts of the fixture;

FIGURE 2 is a side elevational view of the fixture as assembled in FIGURE 1;

FIGURE 3 is a top plan view of the fixture further illustrating details of the inner-relationship of the parts;

FIGURE 4 is an elevational cross section view taken along the line 4—4 of FIGURE 2, showing additional details of the work-holding, cutting, and adjusting features;

FIGURE 5 is a view similar to FIGURE 4 showing the mounting of an end mill from the side, as compared to the Woodruff cutter shown in FIGURE 4; and FIGURE 6 is a cross sectional view showing the direct mounting of an end mill cutter in the slide plate as an alternative approach to cutting a key way in the work piece.

Referring now to the drawings, it will be seen that a main support plate, generally designated by the number 12, is a heavy piece of plate metal which is essentially square. Supporting plate 12 has inside face 14, outside face 16, side edges 18, top edge surface 19, and bottom edge surface 17. Each edge surface has threaded holes 20 which receive the main attaching bolts for securing the guide plate to the supporting plate. Support plate 12 is provided with a work piece receiving opening 22 as shown in FIGURE 2. Opening 22 is centered with respect to the side edge surfaces 18 of the main support plate, but is off-center with respect to the top and bottom edge surfaces 17 and 19. It will be noted that the opening 22 is closer to the bottom edge surface 17 than to the upper edge surface 19, and the reason therefore will be made clear further on in this discussion. Opening 22 is shaped to receive a split-cone shaft holding collar 24 which has tightening bolts 26. The split-cone holding collar 24 is a conventional cone widely used for the securing of shafts and other round work pieces. The cone, because of its construction, and with proper tightening of bolts 26, keeps the shaft or work piece 10 centered with respect to the opening 22. As a practical matter, cone 24 can be tightened from the inside if in event it proves desirable to have the additional space required on the outside and which is occupied by the head-protruding portions of tightening bolts 26. It will be understood by those skilled in the art that opening 22 is formed at an angle so that as cone 24 is drawn into the opening by bolts 26, the inside diameter of the cone is reduced, allowing the cone to grip the work piece 10.

A guide plate, generally designated by the number 30, is attached to support plate 12. Guide plate 30 has outer surface 32 and inner surface 34. The guide plate 30 is essentially rectangular, with the upper surface being grooved along its center portion to form the guide depression or groove 36. Guide plate 30 also has outer end surface 38, inner end surface 40, and side edge surfaces 42. It can be seen that groove 36 is formed along the center portion of the longitudinal dimension and said groove 36 extends between the inner and outer ends 38 and 40. Located in closely spaced relationship to the inner end 40, on the under surface 34 of the guide plate is a right angle receiving notch or recess 44. Recess 44 on the inner end is shaped from side to side or transversely of the longitudinal dimension of the guide plate. At the outer end of guide plate 30, a recess 46 is provided which allows the guide plate to be mounted at an angle with respect to the support plate, to permit the cutting of key ways in tapered shafts if it is so desired. The recess for groove 44 at the inner end allows the guide plate to be attached to the support plate at a right angle for straight shafts. The angle of recess 46 in the outer end has been exaggerated merely to emphasize that a guide plate can be mounted to cut key ways in tapered shafts. Regardless of which end of the guide plate is attached to the support plate, said end will have bolt head depressions 48 which near the lower surface thereof have shoulders 50 for engaging the undersides of the heads of the securing bolts 52. The openings 48, together with shoulders 50 are elongated transversely so that guide plate 30 is permitted some amount of side to side adjustment movement with respect to the supporting plate 12. Side to side adjustment of guide plate 30 can be made with the adjusting bolts 54 which can be seen to be threaded in from the side surfaces 42 to engage bolts 52. At such time as the adjustment is attained, the main securing bolts 52 may be tightened down to make the attachment of the two plates secure.

Guide plate 30 is approximately the same width as support plate 12, but longer in length. Said guide plate is provided with a wide, longitudinal elongated slot opening 56 which extends from end to end of the guide plate for approximately the width of the guide groove 36. The ends of slot openings 56 are spaced from the end surfaces 38 and 40 of the guide plate so as to allow movement of cutter attachments over substantially the entire longitudinal length of the guide plate when the fixture is in use. The bolt head recesses 48 permit the heads of bolts 52 to be received below the upper surface 32 of the guide plate so that the slide plate slidably supported thereon is not obstructed from free longitudinal movement. Both ends of the guide plate will be provided with the bolt depressions 48 so that when desired, recess 46 at the outer end 38 of the guide plate can receive the support plate 12 in the same manner as it is received at the inner end 40.

A slide plate, generally designated by the number 60, is slidably received on the guide plate 30. Slide plate 60 has inner end surface 62, outer end surface 64, and slide edge surfaces 66. The slide plate has upper surface 68 and lower or under surface 70. In addition, the slide plate has raised portion 72 for coacting with the slot 36 in the guide plate. Slide plate 60 is of approximately the same thickness, width, and length as guide plate 30. Slide plate 60 is provided with generally round openings therein, to receive various attachments to be described hereinafter. A first attachment opening 74 is centered near the outer end 64 of the slide plate. A second opening 76 is centered more near the middle of the slide plate and is slightly spaced from the first attachment opening 74. Attachment openings 74 and 76 are approximately equal in diameter to the width of slot 56 in the guide plate, and in being centered with respect to the side edge surfaces 66, register with slot 56 in the guide plate.

A guide wall structure 80 is attached to each side edge surface 42 of the guide plate and is detachably secured thereto by bolts 82. Note that the guide wall structures 80 are shallow channels as a result of which the slide plate is further restrained from transverse movement. Also, the slide plate is incapable of being raised off the guide plate due to the short legs of the channels engaging the lower surface 34 of the guide plate and the upper surface 68 of the guide plate.

An elongated, threaded feed rod, shown by number 86, is the element by which the slide plate is moved. The slide plate itself on two opposed corners has openings 88 which receive engaging head 90 of the feed rod 86, depending upon which end of the slide plate is out. As can be seen, openings 88 are spaced from the end surfaces 62 and 64 so that a notch 92 is required to be cut and formed in the plate between the opening and the end surface. Thus, the engaging head 90 may be confined within the opening 88. The outer end of the feed rod 86 has a permanently attached bolt head 94 to be engaged by a wrench or other means for turning said feed rod. Support for the feed rod is given by an L-shaped holder 96 which has long horizontal leg 98 detachably secured to the under surface 34 of the guide plate by bolts 100. At the outer end of the feed rod holder 96 is an upstanding or generally vertical and shorter leg 102 which has a hole threaded therethrough to receiver rod 86.

One means of holding both Woodruff cutters and end mill bits is shown in FIGURES 1 through 5. This adapter attachment or cutting holder bracket, designated for purposes of this discussion by the number 106, is a heavy section of angle material having a generally horizontal portion 108 and a generally vertical portion 110. Rigidly secured to the upper surface of horizontal portion 108 is an upstanding adjustment shaft 112. Shaft 112 has an interiorly threaded passage 114 from its upper end down to and through the horizontal portion 108. Bracket 106 is held in place in the slide plate 60 by a conventional split-ring tightening collar 116 which receives the shaft 112. Those skilled in the art will appreciate that the tightening collar 116 may be held in either one of the openings 74 or 76 in the slide plate, so that a firm but releasable grip can be maintained on shaft 112. Collar 116, of course, is keyed in the opening 76 or 74 so that it will not turn. It will be appreciated that because the openings 74 and 76 are formed at an angle that as the upper threaded end of the collar is pulled upwardly by a nut or the like the collar reduces in diameter to clamp securely on the shaft. Tightening of the collar 116 for the purposes of the present discussion is accomplished by a tightening member in the form of a large closed-end nut 120.

In order that the bracket 106 may be adjusted vertically, it is necessary that the threaded adjustment rod 122 be provided as a rotatable but longitudinally stationary part of the closure and tightening member 120. Rod 122 has exterior head 124 on the outside of member 120. Immediately on the inside and permanently secured to the rod so that it does not turn thereon, is an interior adjustment head 126. It will be appreciated that while both heads 124 and 126 are secured to rod 122, the rod is designed to rotate freely in an opening provided in the upper end of member 120. When it is desired to move bracket 106 up or down, member 120 is loosened or backed off the collar 116 so that shaft 112 will move under thread force. Rod 122 turned by a wrench or other means applied to head 124 and rod 122 as received in the threaded passage 114 in shaft 112 permits the operator to move the bracket 106 holding a cutting tool. It will be seen that member 120 has to be deep enough so that a portion of shaft 112 may be accommodated within said member 120 when bracket 106 is in its full up position. The vertical leg 110 of bracket 106 is provided with an opening 128 in which collar 132 is received to hold the cutter bearings 130. Spacer 134 and nut 136 are received on the threaded outside portion of the collar 132. Once the cutter has been placed in the bearings the collar member 132 may be tightened with nut 134 to hold the cutter securely. While longitudinal slippage or movement of the cutter shank 138 is prevented, the tightening imposed by the collar 132 does not prevent rotative movement. Obviously, a portion of the cutter shank will be left exposed and extending on the outside of the bearings in order to permit its engagement with drill 142. The dash-dot lines in FIGURE 4 indicate that rod 122 and bracket 106 may be raised and lowered to place the cutter head 140 in position with respect to the work piece 10.

FIGURE 5 shows essentially the same cross-sectional view as FIGURE 4, except that some of the details thereof have been eliminated for purposes of illustrating how this fixture accommodates an end mill type cutting tool in the bracket 106. Note that end mill 146 may be used to cut a key way in the shaft 10 or, as shown in dash-dot lines, to shape flat surfaces. FIGURE 6 shows a cross section of the fixture substantially along the same plane as in FIGURES 4 and 5. Bracket 106 with its adjustment shaft 112 together with the locking nut 120 and its adjustment rod 122 have been removed. Also, supporting plate 12 has been turned 180° so that the opening 22 therein is closer to the slide plate by attachment of the guide plate 12 to edge surface 17. Collar 132 and bearing 130 seen in FIGURES 4 and 5 have been removed from the bracket and installed in opening 76 in the slide plate. Thus an end mill 146 is inserted and held in the collar and bearing structure 130 and 132 and the drill 142 attached to the end mill shank above the slide plate. Hence, FIGURE 6 indicates another manner of cutting the key way in the event available space does not permit use of the drill from the side as would be the case where bracket 106 is employed.

It will be appreciated by those skilled in the art that the flexibility and adaptability of this fixture lie in its compactness and in its ability to mount the cutting tool from the most advantageous or available angle or direction with respect to the work piece. It is also contemplated that the support plate 12 could be supplied in two sections approximately along a line 148 shown in dash-dot lines in FIGURES 1 and 4. Should it be impossible to slip the fixture onto the shaft over the end thereof, the two-piece support plate could be parted and then brought together around the shaft as for instance near the middle, as a section of shaft between motor and gear box. Additionally, a rigidizing bar structure may be provided and bolted in the support plate and guide plates on the side edge surfaces, to insure that there will be no flexing of the fixture as the cutting tool is working.

Those operating the fixture will first determine the dimensions of the key way that is sought to be cut in a shaft and the best manner of assembling the fixture and securing it to the shaft so that the key way can be cut. It then becomes a matter of making adjustments of and tightening the various parts so that the cutting tool is brought into position to perform its function. Details of alignment and adjustment are not necessary to an understanding of this invention, however, and will not be brought into this discussion. Where necessary, the parts as for instance adjustment shaft 112 and collar 116, and other members such as ring 132 will be keyed with respect to the openings. Various sized shafts and even flat work pieces may be received in the fixture for cutting.

This invention embraces the use of standard end mills and standard Woodruff cutters with slightly elongated shanks. It will be appreciated that spline shafts, as well as key ways in shafts, can be shaped with this invention.

It will be appreciated that numerous modifications and changes will occur to those skilled in the art, and that the preferred embodiment shown is merely illustrative of the principles of this invention. Hence it is not desired to limit this invention to the exact construction shown and described. Accordingly, all suitable modifications and equivalents may be resorted to which fall within the scope of the invention.

What is claimed is:

1. A portable key way cutting fixture for shafts and the like, comprising: (a) a supporting plate having an aperture and means in said aperture for receiving and holding shafts and the like; (b) a generally rectangular guide plate detachably secured at one end to one edge of said supporting plate forming substantially a right angle, said guide plate being slotted along the midportion of its length between its ends; (c) a slide plate slidably received on said guide plate, said slide plate having an opening therein registering with said slotted portion of said guide plate; (d) guide means for guiding said slide plate on said guide plate; (e) a cutter tool holding means detachably secured to said opening in said slide plate to receive a cutter tool for extending through said slotted portion; and (f) a slide plate feed means comprising a brace member attached to said guide plate and a feed screw threadably received in said brace member and rotatably received in said slide plate for moving said slide plate on said guide plate.

2. A portable key way cutting apparatus for shafts and the like, comprising: (a) a supporting plate having an aperture and means in said aperture for receiving and holding shafts and the like; (b) a generally rectangular guide plate detachably secured at one end to one edge of said supporting plate forming substantially a right angle, said guide plate being slotted along the midportion of its length between its ends; (c) a slide plate slidably received on said guide plate, said slide plate having an opening therein registering with said slotted portion of said guide plate; (d) guide members detachably secured to opposed sides of said guide plate to slidably receive said slide plate therebetween; (e) a cutter tool holding means detachably secured in said opening in said slide plate to receive a cutter tool for extending through said slotted portion; and (f) a slide plate feed means comprising a feed brace member attached to said guide plate and a feed screw threadably received in said brace member and rotatably received in said slide plate for reciprocal movement of said slide plate on said guide plate.

3. A portable key way cutting fixture for shafts and the like, comprising: (a) a supporting plate having an aperture and means in said aperture for receiving and holding shafts and the like; (b) a generally rectangular guide plate detachably secured at one end to one edge of said supporting plate forming a predetermined angle, said guide plate being slotted along the midportion of its length between its ends; (c) a slide plate slidably received on said guide plate, said slide plate having an opening therein registering with said slotted portion of said guide plate; (d) guide members detachably secured to opposed sides of said guide plate to slidably receive said slide plate therebetween; (e) a cutter tool holding means detachably secured in said opening in said slide plate to receive a cutter tool for extending through said slotted portion in said guide plate; and (f) a slide plate feed means comprising a brace member attached to said guide plate and a feed screw threadably received in said brace member and rotatably received in said slide plate for moving said slide plate on said guide plate.

4. A portable key way cutting fixture for shafts and the like, comprising: (a) a supporting plate having an aperture and means in said aperture for receiving and holding shafts and the like; (b) a generally rectangular guide plate detachably secured at one end to one edge of said supporting plate forming substantially a right angle, said guide plate being slotted along the midportion of its length between its ends; (c) a slide plate slidably received on said guide plate, said slide plate having an opening therein registering with said slotted portion of said guide plate; (d) guide means on said guide and slide plates including a guide groove on said guide plate and a coacting raised portion on said slide plate; (e) a cutter tool holding means detachably secured to said opening in said slide plate to receive a cutter tool for extending through said slotted portion; and (f) a slide plate feed means comprising a brace member attached to said guide plate and a feed screw threadably received in said brace member and rotatably received in said slide plate for moving said slide plate on said guide plate.

5. A portable key way cutting apparatus for shafts and the like, comprising: (a) a supporting plate having an aperture and means in said aperture for receiving and holding shafts and the like; (b) a generally rectangular guide plate detachably secured at one end to one edge of said supporting plate forming substantially a right angle, said guide plate being slotted along the midportion of its length between its ends; (c) a slide plate slidably received on said guide plate, said slide plate having an opening therein registering with said slotted portion of said guide plate; (d) guide means for said slide plate on said guide plate; (e) a slide plate feed means comprising a brace member attached to said guide plate and a feed screw threadably received in said brace member and rotatably received in said slide plate for moving said slide plate on said guide plate; and (f) a cutting tool holding means including an adjustment shaft means releasably held in said slide plate opening and extending through said guide plate slotted portion and also including a generally L-shaped bracket having a supporting leg section connected to said adjustment shaft and a tool holding leg section connected to said supporting section.

6. A portable key way cutting apparatus for shafts and the like, comprising: (a) a supporting plate having an aperture and means in said aperture for receiving and holding shafts and the like; (b) a generally rectangular guide plate detachably secured at one end to one edge of said supporting plate forming substantially a right angle, said guide plate being slotted along the mid portion of its length between its ends; (c) a slide plate slidably received on said guide plate, said slide plate having an opening therein registering with said slotted portion of said guide plate; (d) guide means for said slide plate on said guide plate; (e) a slide plate feed means comprising a brace member attached to said guide plate and a feed screw threadably received in said brace member and rotatably received in said slide plate for moving said slide plate on said guide plate; and (f) a cutting tool holding means including an adjustment shaft means releasably held in said slide plate opening and extending through said guide plate slotted portion and also including a bracket means having a supporting leg section connected to the lower end of said adjustment shaft and a cutting tool holding leg section connected to said supporting section for supporting and holding a cutting tool in position with respect to shafts and the like held in said supporting plate.

7. A portable key way cutting apparatus for shafts and the like, comprising: (a) a supporting plate having an aperture and means in said aperture for receiving and holding shafts and the like; (b) a generally rectangular guide plate detachably secured at one end to one edge of said supporting plate forming substantially a right angle, said guide plate being slotted along the mid portion of its length between its ends; (c) a slide plate slidably received on said guide plate, said slide plate having an opening therein registering with said slotted portion of said guide plate; (d) guide means for said slide plate on said guide plate; (e) a slide plate feed means comprising a brace member attached to said guide plate and a feed screw threadably received in said brace member and rotatably received in said slide plate for moving said slide plate on said guide plate; (f) a cutting tool holding means including an adjustment shaft means releasably held at its upper portion in said slide plate opening by an adjustment member and extending through said guide plate slotted portion and also including a bracket means having a supporting leg section connected to the lower end of said adjustment shaft and a tool holding leg section connected to said supporting section, said adjustment member also having actuating means for adjustably moving said cutting tool holding means.

References Cited by the Examiner
UNITED STATES PATENTS

| | | |
|---|---|---|
| 1,151,020 | 8/1915 | Kunz. |
| 2,373,341 | 4/1945 | Rowe. |
| 2,602,375 | 7/1952 | Holt. |

WILLIAM W. DYER, JR., *Primary Examiner.*

G. A. DOST, *Examiner.*